「(12) United States Patent
Braun et al.

(10) Patent No.: US 6,832,627 B2
(45) Date of Patent: Dec. 21, 2004

(54) DEVICE FOR TRANSPORTING FUEL FROM A RESERVOIR TO AN INTERNAL COMBUSTION ENGINE

(75) Inventors: Hans-Peter Braun, Renfrizhausen (DE); Stefan Woerz, Vaihingen/Enz (DE); Thomas Wieland, Stuttgart (DE); Christian Ast, R. Ant. Joaquim (BR)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 10/203,014

(22) PCT Filed: Nov. 28, 2001

(86) PCT No.: PCT/EP01/13920

§ 371 (c)(1),
(2), (4) Date: Nov. 18, 2002

(87) PCT Pub. No.: WO02/45988

PCT Pub. Date: Jun. 13, 2002

(65) Prior Publication Data

US 2003/0121550 A1 Jul. 3, 2003

(30) Foreign Application Priority Data

Dec. 5, 2000 (DE) ..................................... 100 60 293

(51) Int. Cl.⁷ ............................................... F02M 37/10
(52) U.S. Cl. ................... 137/565.22; 123/514; 123/509
(58) Field of Search ..................... 137/565.22; 123/509, 123/514

(56) References Cited

U.S. PATENT DOCUMENTS

| | | | | |
|---|---|---|---|---|
| 4,842,006 A | * | 6/1989 | Scheurenbrand et al. | ... 123/514 |
| 4,886,031 A | * | 12/1989 | Scheurenbrand et al. | ... 123/516 |
| 5,564,396 A | * | 10/1996 | Kleppner et al. | ........... 123/509 |
| 6,109,299 A | * | 8/2000 | Hashimoto et al. | ......... 137/574 |

FOREIGN PATENT DOCUMENTS

DE          4219516 A1   * 12/1993

* cited by examiner

*Primary Examiner*—John Rivell
(74) *Attorney, Agent, or Firm*—Ronald E. Greigg

(57) ABSTRACT

A fuel delivery device having a collecting receptacle disposed inside a storage tank and from which a delivery unit aspirates fuel and delivers it to an engine. A jet pump which delivers the fuel from the storage tank into the collecting receptacle is disposed close to a bottom of the collecting receptacle and feeds fuel into it through an ascending line that extends up into the vicinity of the upper rim of the collecting receptacle. A separate component is disposed on the outside of a peripheral wall of the collecting receptacle. The outside of the peripheral wall and/or the side of the component oriented toward the peripheral wall has an open channel. The component is tightly connected to the peripheral wall to cover the open channel and to form the ascending line. The collecting receptacle and the component can be easily produced along with the open channel and the component can be attached to the collecting receptacle with a minimum of effort.

14 Claims, 2 Drawing Sheets

DEVICE FOR TRANSPORTING FUEL FROM A RESERVOIR TO AN INTERNAL COMBUSTION ENGINE

CROSS-REFERENCE TO RELATED APPLICATIONS

This application is a 35 USC 371 of PCT/EP 01/13920 filed on Nov. 28, 2001.

BACKGROUND OF THE INVENTION

1. Field of the Invention

The invention is based on a device for delivering fuel from a storage tank to an internal combustion engine, the device including a collecting receptacle in the storage tank and from which fuel is to be delivered is aspirated.

2. Description of the Prior Art

DE 42 19 516 A1 has disclosed a fuel delivery device having a collecting receptacle, which is disposed inside the storage tank and from which a delivery unit aspirates fuel and delivers it to the internal combustion engine. The device also has a jet pump, which delivers fuel from the storage tank into a collecting receptacle. The jet pump is disposed close to a bottom of the collecting receptacle and delivers fuel into the collecting receptacle through an ascending line that extends from the bottom of the collecting receptacle up into the vicinity of its upper rim. The ascending line in this case is embodied of one piece with the collecting receptacle, which complicates production of the collecting receptacle and requires a complex mold. At the upper end of the ascending line, a deflecting device is provided, which conveys the fuel coming out of the ascending line into the collecting receptacle. This deflecting device cannot be embodied of one piece with the collecting receptacle and must instead be connected to the collecting receptacle as a separate part, which increases assembly costs.

SUMMARY OF THE INVENTION

The device according to the invention has the advantage over the prior art that the ascending line is formed through the connection of the separate component to the collecting receptacle; the two parts are easy to manufacture and can be produced with simple molds.

Advantageous embodiments and modifications of the device according to the invention are disclosed. One modification assures that fuel coming out of the ascending line travels into the collecting receptacle; the deflecting device according to another feature can easily be formed onto and of one piece with the component. A further embodiment permits a simple fastening of the component to the collecting receptacle.

BRIEF DESCRIPTION OF THE DRAWINGS

An exemplary embodiment of the invention is shown in the drawings and will be explained in detail in the subsequent description. In the drawings.

DESCRIPTION OF THE PREFERRED EMBODIMENTS

Figure 1:
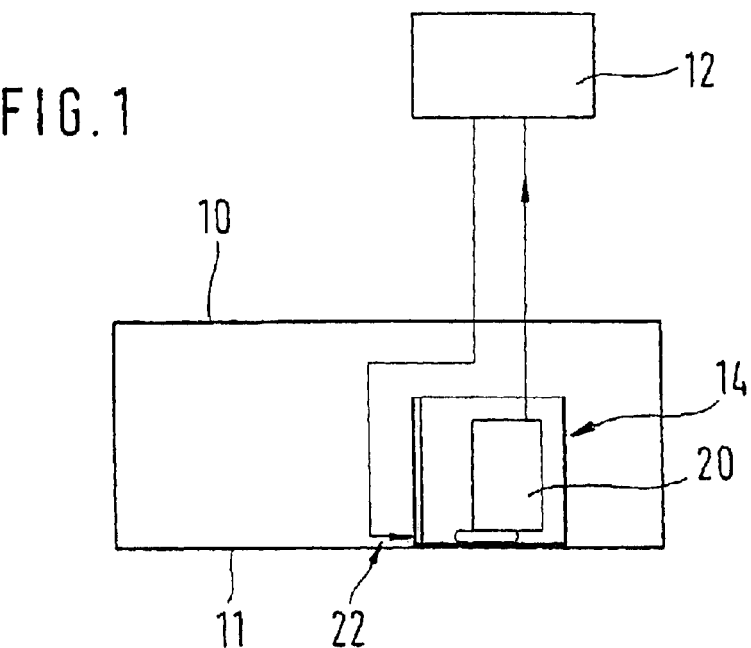
FIG. 1 schematically depicts a device for delivering fuel from a storage tank to an internal combustion engine.
Figure 2:
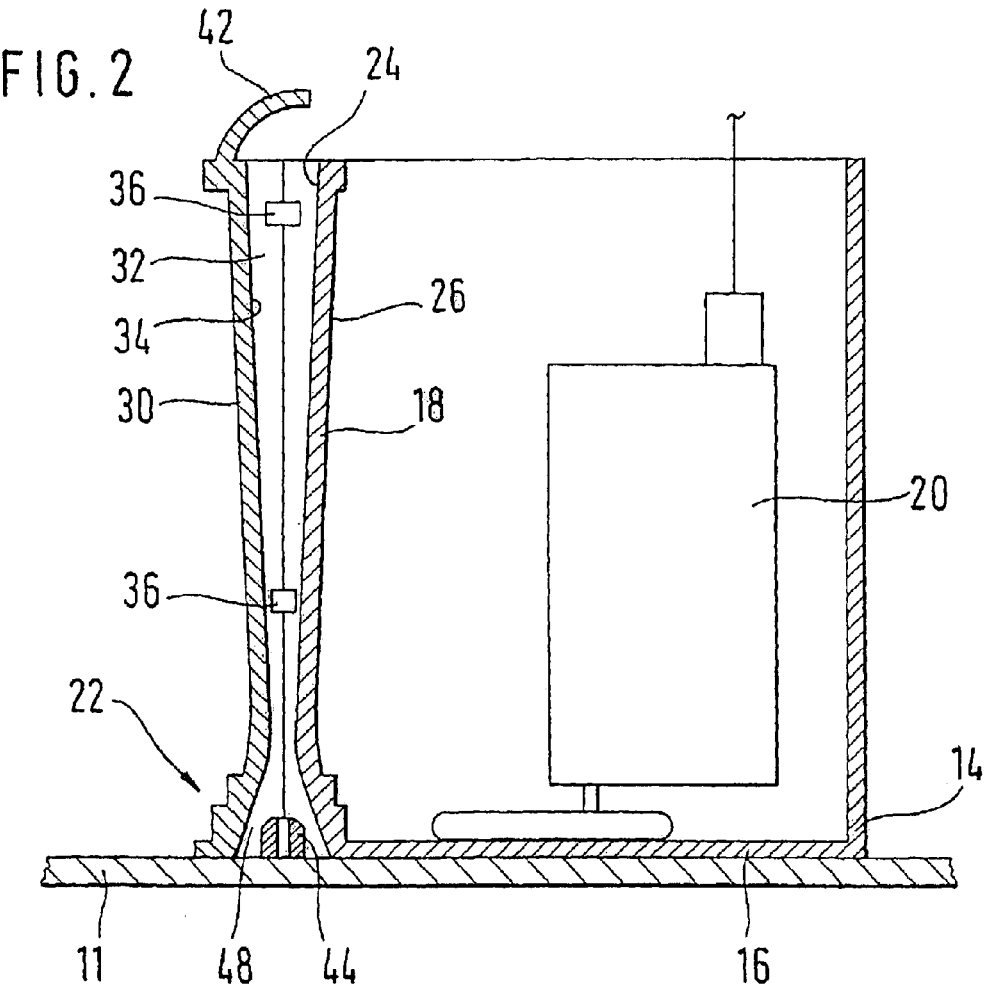
FIG. 2 shows an enlarged longitudinal section through a collecting receptacle of the device.
Figure 3:
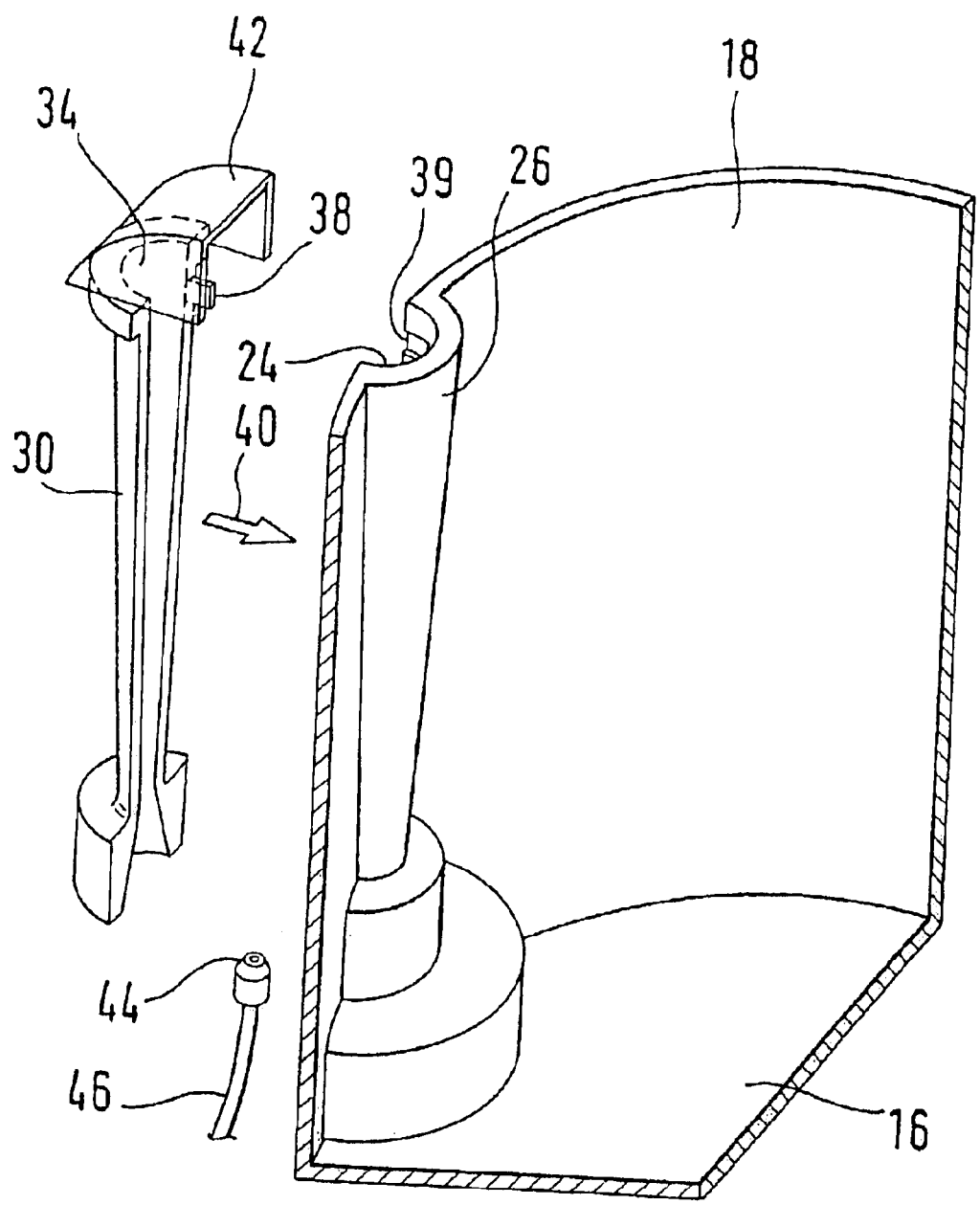
FIG. 3 shows a perspective view of a detail of the collecting receptacle.

FIGS. 1 to 3 depict a device for delivering fuel from a storage tank 10 to an internal combustion engine 12 of a motor vehicle. A cup-shaped collecting receptacle 14 is disposed inside the storage tank 10 and has a significantly smaller volume than the storage tank 10. The collecting receptacle 14 has a bottom 16 and a peripheral wall 18. The collecting receptacle 14 rests with its bottom 16 against the bottom 11 of the storage tank 10. The collecting receptacle 14 can be embodied as open or closed at the top. The collecting receptacle 14 contains a delivery unit 20, which has an electrical drive motor and a pump part, and which aspirates fuel from the collecting receptacle 14 and delivers it to the internal combustion engine 12. In addition, a jet pump 22 is provided, which delivers fuel from the storage tank 10 into the collecting receptacle 14. The jet pump 22 assures that there is a sufficient fuel volume in the collecting receptacle 14 from which the delivery unit 20 can aspirate, even when the level in the storage tank 10 is low.

The jet pump 22 is disposed close to the bottom 16 of the collecting receptacle 14 and close to the bottom 11 of the storage tank 10. On the outside of its peripheral wall 18, the collecting receptacle 14 has a for example approximately vertically extending channel 24 that is open toward the outside. The cross section of the channel 24 can be embodied approximately in the form of a fraction of a circle, for example a semicircle. The cross section of the channel 24 increases considerably toward its bottom end. The cross section of the channel 24 can also gradually increase or remain constant as it extends toward the upper end. The channel 24 on the peripheral wall 18 produces an indentation 26 on the inside of the collecting receptacle 14. The collecting receptacle 14 can be comprised of plastic and can be manufactured by being injection molded in an injection mold. In this case, the open channel 24 can be easily formed into the peripheral wall 18. Alternatively, the collecting receptacle 14 can also be comprised of metal and can be produced by being formed; here, too, the open channel 24 can be easily formed during the manufacture of the collecting receptacle 14.

A separate component 30, which is disposed outside the collecting receptacle 14, can be connected to it in such a way that the channel 24 in the outside of the peripheral wall 18 is covered and a closed conduit 32 is produced, which constitutes an ascending line. In its side oriented toward the peripheral wall 18, the component 30 can also have an open channel 34, whose cross section is embodied to be at least approximately the same as that of the channel 24 in the peripheral wall 18 of the collecting receptacle 14. The component 30 is tightly connected to the peripheral wall 18 of the collecting receptacle 14 so that the closed ascending line 32 is formed, whose cross section is circular, for example. The cross section of the channel 34, and therefore the cross section of the entire ascending line 32, increases toward the bottom and toward the top, as explained above in conjunction with the channel 24. It is also possible that no channel 34 is provided in the component 30 and that it only covers the channel 24 of the peripheral wall 18 to form the closed ascending line 32. In addition, it is also possible that only the channel 34 in the component 30 is provided and that no channel is provided in the peripheral wall 18 of the collecting receptacle 14; when the two parts are connected to each other, the peripheral wall 18 covers the channel 34 in the component 30 to form the closed ascending line 32.

The component 30 is preferably comprised of the same material has a collecting receptacle 14, for example plastic or metal, and can be produced by means of injection molding or forming. The component 30 can be fastened to the peripheral wall 18 of the collecting receptacle 14, for example, by means of at least one detent connection 36. In this instance, a number of resilient detent arms 38 can be formed onto the component 30 and can engage in detent fashion in corresponding detent engagement points 39 on the peripheral wall 18. The detent arms 38 can also be provided on the peripheral wall 18 and the detent engagement points 39 can correspondingly be provided on the component 30. To be fastened, the component 30 is simply placed vertically against the peripheral wall 18 from the outside in accordance with the arrow 40 in FIG. 3, and the detent arms 38 snap into place. Alternatively, welding or gluing, for example, can also be used to tightly fasten the component 30 to the peripheral wall 18 of the collecting receptacle 14.

A deflecting device 42, which conveys the fuel coming out of the ascending line 32 into the collecting receptacle 14, can be disposed at the upper end region of the component 30. The deflecting device 42 is embodied as a hood, which covers the mouth of the ascending line 32 in the region disposed outside the collecting receptacle 14. The hood 42 can be embodied in an inclined and/or curved fashion in order to deflect the emerging fuel into the collecting receptacle 14 with the least possible flow resistance. The hood 42 can be formed onto and of one piece with the component 30, which is easy to achieve by means of injection molding or forming.

To form the jet pump 22, a nozzle 44 is inserted into the lower, cross-sectionally enlarged region of the ascending line 32 and is connected to a propulsion line 46. Between the nozzle 44 and the conduit 32, an annular space 48 remains, which is connected to the storage tank 10 and through which the fuel from the storage tank 10 is entrained by the propulsive jet emerging from the nozzle 44 so that this entrained fuel, together with the fuel coming out of the nozzle 44, travels into the ascending line 32 and from there, into the collecting receptacle 14.

The collecting receptacle 14 does not have any opening leading to the outside and in the event of a leak in connection of the component 30 to the peripheral wall 18 of the collecting receptacle 14, the collecting receptacle 14 can empty out. Therefore a separate sealing element is not required between the peripheral wall 18 of the collecting receptacle 14 and the component 30.

The foregoing relates to preferred exemplary embodiments of the invention, it being understood that other variants and embodiments thereof are possible within the spirit and scope of the invention, the latter being defined by the appended claims.

What is claimed is:

1. A device for delivering fuel from a storage tank to an internal combustion engine, comprising a collecting receptacle (14) disposed inside the storage tank (10), a delivery unit (20) for aspirating fuel from the collecting receptacle and delivering it to the engine (12), a jet pump (22) in the storage tank which delivers fuel from the storage tank (10) into the collecting receptacle (14), the jet pump (22) being disposed close to a bottom (16) of the collecting receptacle (14) and including an ascending line (32) that extends up into the vicinity of the upper rim of the collecting receptacle (14) for feeding fuel into the collecting receptacle, a separate component (30) disposed on the outside of a peripheral wall (18) of the collecting receptacle (14), and an open channel (24; 34) defined by the outside of the peripheral wall (18) and/or the side of the component (30) oriented toward the peripheral wall (18)

the component (30) being tightly connected to the peripheral wall (18) to cover the open channel (24; 34) and to form the ascending line (32).

2. The device according to claim 1, further comprising a deflecting device (42), which conveys the fuel coming out of the ascending line (32) into the collecting receptacle (14), being disposed at the upper end region of the component (30).

3. The device according to claim 2, wherein the deflecting device (42) is embodied of one piece with the component (30).

4. The device according to claim 1, wherein the component (30) is fastened to the peripheral wall (18) by means of at least one detent connection (36).

5. The device according to claim 2, wherein the component (30) is fastened to the peripheral wall (18) by means of at least one detent connection (36).

6. The device according to claim 3, wherein the component (30) is fastened to the peripheral wall (18) by means of at least one detent connection (36).

7. The device according to claim 1, wherein the component (30) is fastened to the peripheral wall (18) by means of a welded connection or a glued connection.

8. The device according to claim 2, wherein the component (30) is fastened to the peripheral wall (18) by means of a welded connection or a glued connection.

9. The device according to claim 3, wherein the component (30) is fastened to the peripheral wall (18) by means of a welded connection or a glued connection.

10. The device according to claim 1, wherein the collecting receptacle (14) and the component (30) are comprised of plastic and are produced by means of injection molding.

11. The device according to claim 2, wherein the collecting receptacle (14) and the component (30) are comprised of plastic and are produced by means of injection molding.

12. The device according to claim 3, wherein the collecting receptacle (14) and the component (30) are comprised of plastic and are produced by means of injection molding.

13. The device according to claim 4, wherein the collecting receptacle (14) and the component (30) are comprised of plastic and are produced by means of injection molding.

14. The device according to claim 7, wherein the collecting receptacle (14) and the component (30) are comprised of plastic and are produced by means of injection molding.

* * * * *